July 27, 1937.  H. WEHMING  2,088,355
TESTING DEVICE
Filed July 3, 1935  2 Sheets-Sheet 2

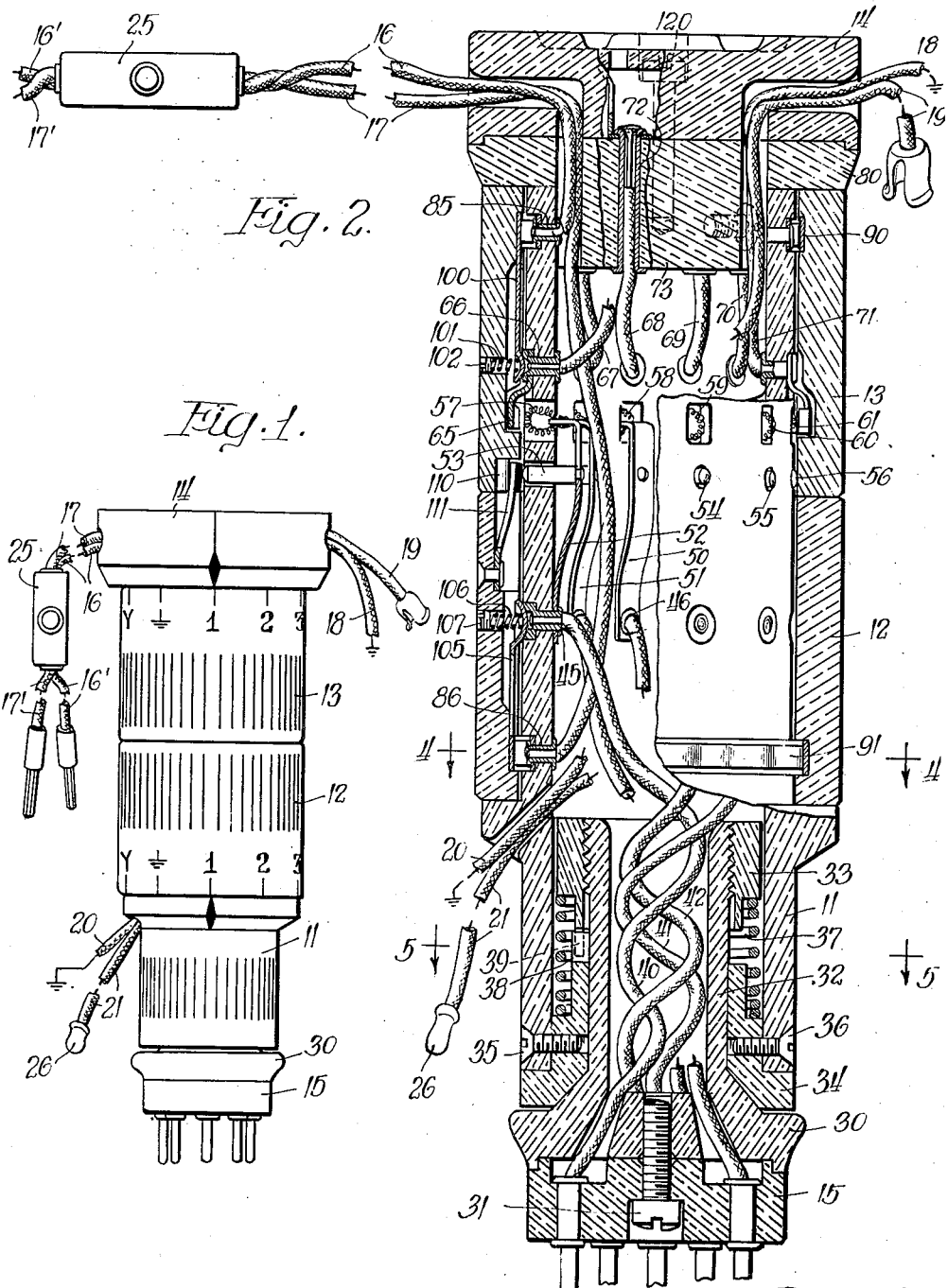

Inventor:
Henry Wehming.
By
Atty.

Patented July 27, 1937

2,088,355

UNITED STATES PATENT OFFICE 2,088,355

TESTING DEVICE

Henry Wehming, Chicago, Ill.

Application July 3, 1935, Serial No. 29,644

14 Claims. (Cl. 250—20)

My invention relates, generally speaking, to testing apparatus and is specifically concerned with a new and improved testing device particularly adapted for testing radio appliances and combining a number of heretofore independently applied elements and structures such as cables, plugs and switches in one compact and easily operated unit. This unitary device is designed to save time for the operator and to furnish more accurate test results than were heretofore possible with conventional instruments.

My new device may be employed in conjunction with existing analyzer and testing equipment and is adapted for testing practically any type of apparatus using electronic tubes or the like, such as radio apparatus, for example, radio receiving sets without requiring any dismantling or any particular adjusting operations. In addition, my device is equipped with indicator means whereby the testing is greatly expedited and the possibility of erroneous reading is practically eliminated. The invention furnishes a testing aparatus of particular merit because of its compact and unitary structure which can be employed for laboratory, shop, and also for field work. It does not render obsolete other testing apparatus, while improving the handling and the performance of known equipment if used in conjunction therewith.

A brief review of the prior art is rendered below in order to furnish a basis for a better understanding of my invention.

The manufacture and also the servicing of electronic apparatus, for example, of receiving sets, and the like requires testing equipment for indicating the electrical condition of numerous circuits including the tubes. There are many so-called "analyzers" known for making the required tests. Known analyzers usually comprise the requisite measuring instruments, sockets for receiving tubes for testing, and also plug and cable means for connecting the device with the apparatus to be tested. It is apparent that the value of any test of this character is impaired if it is made under conditions that are not present in the set itself, or if it involves the use of equipment which tends to modify the electrical conditions prevailing within the set or apparatus to be tested. The more the natural conditions of the apparatus under test are approximated and maintained during the test, the more accurate will be the test results.

Most of the known testing equipment for this purpose involves more or less changes in or displacements of the various elements of the apparatus which is desired to be tested. For example, if a tube and its related circuits are to be checked, the tube is removed from the set and inserted in a socket in the test set. An analyzer plug is inserted in the device under test in place of the tube removed therefrom and the circuit is switched onto the test equipment by means of more or less conventional cable provisions. In other words, a cable is interposed between the test apparatus and tube and the proper operating position of the latter in the device under test. The cable introduces electrical conditions relative to the tube and to the testing equipment that are not present in the apparatus subjected to the test and the reading is adversely affected. The use of an ordinary cable is therefore bound to introduce errors and inaccuracies. Nor is this the only source for trouble and inaccuracy that should be considered. After the tube is placed relative to the testing device, its numerous, individual circuits must be checked relative to the receiving set or other apparatus from which it was removed. This is done by means of test cables. The operator switches the terminals of the test cables manually from point-to-point; in the parlance of the trade, the operator "fishes" for the respective circuits. The test device is located at a distance from the device to be tested and the operator is forced to check and to recheck each circuit at two points, namely, at the device under test, e. g., the radio set itself and at the analyzer apparatus which is located at a distance therefrom. This procedure requires considerable time on account of the physical placement of the apparatus and also demands considerable experience and training. Errors are easily possible. A further source of trouble resides in the multiplicity of test equipment in use, each requiring slightly different steps in the test procedure. Attempts at producing universal testing or analyzing equipment have been made, but so far they have not produced entirely satisfactory results.

Another development along this line proposes the use of individual switches for numerous testing operations whereby the point-to-point manual switching is facilitated. However, even the latest type of equipment of this character necessitates the use of a conventional cable for extending the circuits of an apparatus under test to the testing device, and wherever individual switches are used, one switch is provided for each separate circuit, necessitating a great number of separate operations of separately disposed devices which the operator must coordinate.

The problem of testing, as briefly discussed above, is further greatly complicated by continual innovations in tubes, in their functions, and also in their physical make-up.

The drawbacks resulting from this condition are eliminated by my invention and the testing operations are considerably facilitated and rendered more reliable and more accurate, generally speaking, regardless of the particular type of testing apparatus that is available and regardless of the type of electronic equipment, e. g., radio apparatus that might have to be tested.

Briefly stated, my new device may be termed in its specific and most widely useful embodiment a universal radio circuit switching device and is a combination of an analyzer plug, cable, and universal switch whereby point-to-point testing of current, potential, and resistance analysis, and also tube testing can be carried out definitely, accurately and quickly. My invention eliminates trouble and errors which were formerly due to adverse changes in inductance and capacitance caused by the use of orthodox cable equipment. The electrical conditions of the apparatus to be tested are preserved to a greater degree than with any other prior device. All circuits may be controlled from a specially constructed unitary switch. The device requires merely the successive setting to the desired positions and eliminates all guesswork.

Generally stated, the device consists of a tubular body forming a cable provided at one end with a suitable plug and at the other end with a universal socket. A tube is removed from the apparatus to be tested and the test device is put in its place by means of the plug, while the tube is inserted in the proper place in the universal socket.

Leads are provided for connecting the device with suitable meter or analyzer apparatus. The tubular cable or carrier body is provided with a plurality of rotatable tubular members or switch rotors which are operable relative to predetermined index or indicating points These rotor members represent the universal switch and enable the operator to set the device according to any circuit or measurement which he wishes to inspect or to carry out. The various connections are provided interiorly, if desired, in fixed symmetrical position to each other and the carrier tube may be shielded in order to improve the performance of the cable. Certain tests require a series connection of a meter or the like and other tests (of the same circuit) require parallel connection. The device may be built to render the requisite switching automatically or semi-automatically, as will be presently described in detail. The device is so constructed that the index or indicator may be disposed facing the operator no matter in what particular position the apparatus is initially inserted in the apparatus to be tested. A double pole switch may be disposed in the test leads to the meter circuit for maintaining the circuit open until the proper range on the meter is selected. The previously noted universal socket is arranged to accommodate substantially all types of tubes. The device is of compact structure and takes into account the crowded conditions in appliances such, for example, as a radio apparatus. Its diameter corresponds substantially to the diameter of a vacuum tube. Some of the objects of the invention may be stated separately as follows:

One object is concerned with a testing device of this character wherein a number of elements such as plug, cable and switch are combined in one compact and unitary structure.

Another object relates to a new universal socket whereby I am able to accommodate any one of a plurality of tubes of different construction and function.

A further object relates to a novel switch structure for switching and inter-switching a plurality of circuits together with automatic means for variably conditioning said circuits.

Still another object has to do with a new analyzer cable structure whereby undesirable changes in capacitance and inductance are avoided.

An additional object relates to an index or indicator whereby the operator can set any one of a plurality of circuits for testing.

Still another object refers to the provision of means for positioning the apparatus so that the index faces the operator at all times.

Other objects and features not specifically mentioned above, including novel contact means, and switching provisions included in certain test conductors, will appear from time to time as the description progresses, which is rendered below in detail with reference to the accompanying drawings, in which:

Fig. 1 represents a front view of the complete device ready for use;

Fig. 2 is a longitudinal section through the device on an enlarged scale with parts broken away in order to illustrate details;

Figure 4:
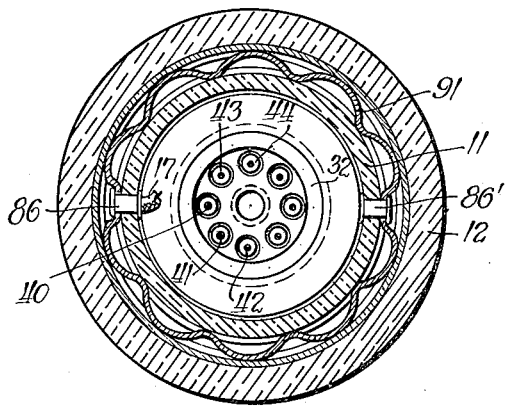
Fig. 4 represents a transverse cross section along line 4—4 of Figure 2.

The invention will now be explained in detail with reference to these drawings and it should be observed that like parts are numbered alike to facilitate the description. It should also be noted that the device of my invention is described chiefly in conjunction with radio sets for purposes of convenient description; it will be clear, of course, that the use thereof is not limited in any way to radio sets alone or to any specific kind or type of electronic apparatus, although the use in conjunction with radio sets and related equipment furnishes probably the widest field of application in practice.

Referring now to Fig. 1, the device consists of a tubular cable or carrier body 11 on which are disposed two rotatable tubular switching members or rotors 12 and 13. Each of these members is circumferentially roughened or knurled in order to provide for easy handling. A multi-tube universal socket 14 is disposed at the upper end of the device and a suitable plug 15 is placed at its lower end. The plug 15 is within predetermined limits rotatable within the tubular member 11. Two test leads 16—17 and 16'—17', respectively, project from the device for connecting the same to a suitable meter, indicator or analyzer apparatus which may be of any convenient and known structure. A switch 25 may be disposed at a suitable point in the leads 16 and 17. This switch is also particularly shown in Figure 7 and will be presently described in detail. In the other figures I have shown this switch more or less conventionally. Two leads 18 and 19 extend to the outside for completing the ground (18) and the cap (19) connection to the tube to be tested. Additional leads 20 and 21 are provided for establishing the corresponding connection to ground and to the tube cap leads respectively in the set to be tested.

Briefly stated, the device may be used as follows: A tube is removed from its operating position in the set under test and the new apparatus as shown in the drawings is inserted in its place. It is simply plugged into the corresponding socket from which the tube is removed, the connection being established by means of the plug 15. The device is of compact structure, the diameter of its lower portion corresponding substantially to the diameter of a tube so as to permit its use in any crowded space without trouble. I have shown at 15 an eight-prong plug, but it is understood that any convenient and desirable number of prongs may be provided. An adaptor socket-plug may be used, if necessary. The device is then rotated by means of the body member 11 so that the indicator points face the operator. The manner in which this is accomplished will be presently described. The tube which was removed from the set is inserted into the proper place in the socket 14 which may be of any suitable structure or of the universal new type as I have shown, e. g., in Fig. 3. The lead 19 is connected to the cap of the tube and the lead 18 furnishes the ground connection therefor. The lead 20 is connected to the ground connection of the set and to the lead 21 or, rather to say, to the terminal 26 attached thereto, will be connected the cap lead provided in the set for the corresponding tube. The terminals of the leads 16 and 17 or, rather the terminals of the leads 16'—17', are connected to the analyzer, meter or other instrument and the testing can begin. It is carried out simply by rotating the switch rotors 12 and 13 relative to each other and aligning them in suitable sequence with the index points on the apparatus. The various indicating points on the rotor may be numbered in accordance with the functional purpose of the prongs of the tubes. Of course, it will be understood that any other scheme of designating the testing points may be adopted. Arranged interiorly are the switching points which are controlled by the rotors 12 and 13. All the operator has to do is to rotate the rotors successively to the proper indicating points and to take the readings on the instruments. Once the apparatus is set, for example, for testing the grid current (which condition might be tested when the apparatus is set as shown in Fig. 1), there is no error possible that might be due to any wrong adjustment or to slipshod procedure because the apparatus automatically takes care of the correct switching. Likewise, any other condition such as the anode current or the heater current, etc. etc. may be tested simply by turning the rotors to the proper testing points. There will be no fishing for any circuit, and beyond the knowledge of the reading of the indicator designations the operator does not need any particular instructions. The operation will be facilitated by the adoption of such designations or symbols as refer functionally to the various circuits terminating in the prongs of the tube.

I will now describe the invention in detail with reference to the remaining figures of the drawings.

Figure 5:
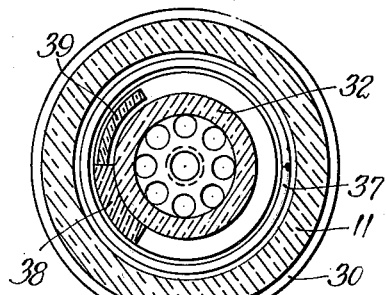
Fig. 5 illustrates a section along line 5—5 of Figure 2.

The carrier body 11, which represents the cable of my device, may be a tubular body made of suitable insulating material. At its lower end this tubular body carries the plug 15, which may be suitably attached to the supporting bushing member 30, e. g., by means of a screw 31. The prongs extend downwardly from the plug as shown. The supporting member 30 has a neck 32 at the end of which is an external thread carrying a sleeve 33. Another sleeve 34 is mounted at the lower end of the tube 11, for example, by means of screws such as 35 and 36. Each of these sleeves 33 and 34 is provided with a neck, as shown, furnishing an annular space for accommodating the spring 37. The lower sleeve is provided with a boss 38 extending from its neck and the upper sleeve is provided with a similar projection or boss 39, as is particularly indicated in the cross section shown in Fig. 5. It will be seen that the bushing member 30 is rotatable within the lower portion of the tubular body 11 but its rotation is limited by the interlocking projections or bosses 38 and 39, respectively, on the neck portions of the sleeves 33 and 34. The spring 37 provides sufficient tension so as to furnish desired friction between the internal conical portion of the sleeve 34 and the corresponding external conical portion of the supporting or mounting bushing member 30.

When the device is put in position with the prongs of the plug 15 engaging the corresponding socket or socket-plug adaptor on the set to be tested, the operator will rotate the entire device by means of the knurled portion on the tubular body 11 so that the index faces him. Inasmuch as he will subsequently rotate the switch rotors 12 and 13 for performing the requisite switching operations, it will be understood that the rotation of these rotors should not cause any corresponding rotation of the device in its operating position and for this purpose the spring 37 provides a friction between the corresponding rotating parts which is greater than the friction created by the rotors 12 and 13 in their operating positions.

The conductors, such as 40, 41, 42, 43, 44, etc. extending from the prongs on the plug 15, terminate in contact points such as 45, 46, which are substantially symmetrically disposed in the interior of the insulating body 11. The conductors 20 and 21 terminate in similar contact points within the tubular body. In this example of the embodiment of the invention, there are eight prongs on the plug 15, and therefore eight conductors such as 40—44 terminate in eight corresponding contact points such as 45 and 46. The conductors 20 and 21 terminate in two other like contact points. Therefore, in this specific embodiment which is rendered for convenience of description, there are ten such contact points annularly arranged in the tube or tubular body 11 in which these conductors terminate. It may be noted at this point that I have shown the various conductors arranged in relatively loose position in the device. However, it will be understood that it is entirely possible and within the scope of this disclosure to place each of these conductors in relatively fixed position. By fixed position I mean such a position of the conductors that they are relatively rigidly disposed as, for example, in a Lecher system whereby alterations in the capacitance and inductance are substantially avoided. However, since it is necessary to provide for a partial rotation of the device relative to the plug 15, some movement of these conductors within the device will have to be provided for and, if desired, a convenient joint may be interposed or the conductors may be disposed relatively loosely for a suitable distance to compensate for the requisite rotation.

Extending from each of the contact points such as 45 and 46 and interiorly disposed in the tube 11 is a contact spring or blade such as indicated in the drawings by the reference numerals 50, 51, and 52. Each contact is provided with an operating member such as 53, 54, 55, and 56, and each of these members projects through a corresponding opening in the tube 11 as shown. Each contact spring is provided with a contact proper such as indicated at 57, 58, 59, 60, and 61 and each of these contacts also projects through corresponding annularly disposed openings in the tube 11. These contacts are normally in engagement with contact members such as indicated in Figure 2 at 65 and each of the latter is connected to a contact such as 66. The latter contacts in turn are connected by means of conductors such as 67, 68, 69, 70, and 71 with sleeves such as 72 provided in the insert 73 which closes the tube 11 at its other end by means of the flange 80. Attention is directed to the specific type and structure of contact members, such as 57, 58, 59, 60, which have been shown for purposes of description. Other contact structures may clearly be used in their place if desired.

It will be seen from the above description that each of the prongs on the plug 15 is wired to a corresponding point in the closure member 73—80 at the upper end of the device. In other words, each contact point provided at one end of the device is in circuit with a corresponding contact point at the other end thereof, and the conductor means for establishing these series circuits are substantially symmetrically disposed in the interior of tube 11 which forms the cable part of the instrument. The conductors 20 and 21 are also extended through the tube 11 by way of contact provisions but are not connected to the closure member 73. Instead they project from the device as leads 18 and 19. Each connection, including the connections between the wires 20—21 and 18—19 extends therefore by way of a switch comprising a spring or blade such as 52, a movable contact such as 57 or its suitable equivalent, and a relatively stationary contact such as 65 or the like. It will thus be seen that each of these connections may be opened or interrupted if desired. This switching mechanism will be presently described more in detail.

I wish to call attention now to the switching arrangement including the meter leads or conductors 16 and 17. The first of these conductors is connected to a contact point 85 near the upper end of the tube 11, while the conductor 17 is connected to a similar contact 86 near the lower or opposite end of the device. Mounted in relatively fixed position in an annular groove provided in the upper part of the tube 11 is an annularly extending contact band 90 which is in relatively fixed engagement with the contact 85 and a similar contact band 91 is disposed in an annular groove in the lower part of tube 11 and maintains engagement with the contact 86. Thus there is conductive relation established between the lead 16 and the contact band 90 and between the lead 17 and the contact band 91. Each of these contact bands may be of an undulating structure, as is particularly apparent from Fig. 4. It will be seen that the contact band 91 is secured in the annular groove in the body 11 by means of the bushings such as 86 and 86', the lead 17 extending from the contact bushing 86 as shown. Numeral 12 in this figure indicates the lower rotor 12 shown also in Figures 1 and 2. 32 is the sleeve on the member 30 which is rotatable within the tubular housing 11 as previously described. Disposed in the interior of the sleeve 32 are the conductors such as 40, 41, 42, 43 and 44, which extend from the prongs of the plug 15, as previously described. It will be seen that these conductors are shown in Figure 4 in symmetric relationship. If desired, suitable channels or ducts may be provided, one for each conductor.

The upper tubular rotor 13 carries an internal contact member 100 which is biased in the direction of the center of the device by means of a spring 101, and the latter is held in position by a stud screw 102. This contact 100, as shown, is in conductive engagement with the contacts 65 and 66. It will thus be seen that the lead 16 may be connected by simple rotation of the rotor 13 on the device with any contact point such as 66 and thus with any of the circuits corresponding to these various annularly arranged contacts. The lower tubular rotor 12 is equipped with a similar spring 105 which at one end contacts the undulating band 91 and at the other end is in engagement with the contact point 45. This contact 105 is also biased by means of a spring 106 which is held in position by a stud screw 107. Since each of the contacts such as 45 is connected to a circuit extending from a prong on the plug 15 to a corresponding contact point in the closure member 73—80, and since the tubular rotor 12 can be turned on the carrier tube 11, it will be understood that it is possible to connect also the meter lead 17 with any of the circuits of the tube. In other words, the leads 16 and 17 may be selectively connected in parallel with any of the series circuits existing between the prongs on the plug 15 and the corresponding points in the closure member 73—80.

The upper rotor 13 is also provided with a cam member 110 and the lower rotor member 12 is provided with an operating spring 111. Whenever the cam 110 is in the position shown, it will actuate the member 111 and this member in turn will actuate an operating member such, e. g., as 53, 54, 55, or any other like extension which projects at regular annular intervals through the tube body 11, but this condition is possible only when cam 110 and member 111 are in alignment and when both are in alignment with any one of the operating members 53, 54, 55 or 56, etc. Whenever such alignment is obtained, the corresponding spring, such as 52, of the respective circuit, will be lifted and moved to open the corresponding series connection. Assuming for the moment that the rotor 13 and the rotor 12 are in alignment, as shown, and are in annular alignment with the projecting member 53, then it will be clear that the spring 52 will be in actuated position, as shown, and the contact between 65 and 57 will be interrupted. This condition will be brought about selectively whenever it is desired to insert the meter leads 16 and 17 in series with any of the circuits extending from any of the prongs on plug 15 to the contact points such as 72 on the closure member 73. It is thus possible to insert the meter circuit (leads 16—17) in series with any of the circuits provided between a set and a tube and also to insert the meter circuit in parallel with each of these test circuits. The first connection is required, e. g., for measuring the current of any connection; the second is necessary, e. g., for inspecting the potential of any connection.

Additional possibilities for establishing interconnecting relationships are readily apparent. For example, the switch rotor 13 may be turned to any desired position and the rotor 12 may also be turned to any desired different position on the device. Thus, any desired interconnection and cross connection between any of the circuits may be carried out.

Figure 6:
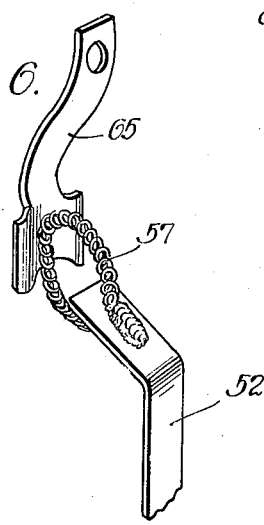
Fig. 6 is an enlarged view of a detail showing particularly the type of new multi-point contact which may be employed.

The type of contact which may be employed is particularly illustrated in Figure 6. Numeral 65 indicates the relatively stationary contact of like structure shown in Figure 2, and 52 indicates the contact spring carrying the contact 57. The latter may be in the form of a coiled spring, made of suitable material, so as to furnish numerous contact points with the contact surface of the member 65. Different types of contacts may be used if desired.

Figure 3:
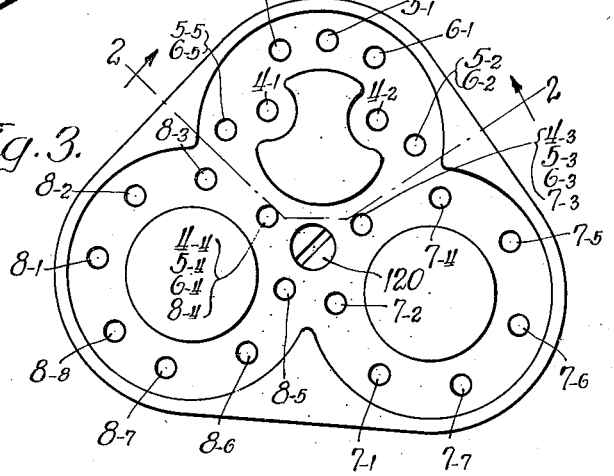
Fig. 3 is a top view of the device on an enlarged scale and shows particularly an embodiment of the universal tube socket provided at the upper end of the instrument.

The universal socket 14 will be described next with reference to Figure 3 showing a more or less diagrammatical view thereof. It will be seen that this socket comprises the body 14 which may be suitably shaped and secured to the closure member 73 by any suitable means, for example, by means of a screw 120. This socket is provided for accommodating tubes having four, five, six, seven or eight prongs. The common contact points are separately indicated in Figure 3. For example, number 3 opening is common to the four, five, six and seven-prong tubes. Number 4 opening is common to the four, five, six and eight-prong tubes. In Fig. 3, the first numeral in connection with each opening indicates the type of tube relative to the number of its prongs and the second numeral indicates the number of the prong of the corresponding tube. The sequence of the prong openings is in clockwise direction. It will be understood that I have indicated this universal socket to be attached to the apparatus by means of a screw 120 only for the sake of convenient description. It is also possible to provide the closure member 73—70 in the form of a socket and to provide the socket 14 at one end with corresponding prongs engaging the socket, that is to say, to modify the structure so as to plug the universal socket 114 into the closure member 73—80 instead of attaching it by means of a screw. Likewise, any other suitable socket may be employed in place of the one shown. Interconnections within the socket or provided within the closure member so as to take care of common points have been omitted for the sake of clarity. Known or otherwise apparent mechanical provisions necessitated by the structure of the tube have also been omitted.

Figure 7:
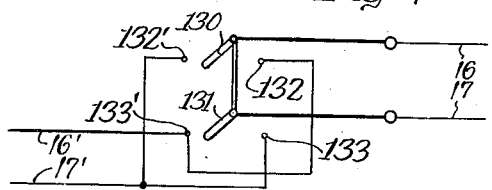
Fig. 7 illustrates diagrammatically the switch disposed within the leads to the meter.

The circuit of the switching device indicated by numeral 25 as being located in the leads 16 and 17, is diagrammatically shown in Figure 7. Numerals 16 and 17 again indicate the leads numbered correspondingly in Figures 1 and 2. Numerals 16' and 17' indicate the leads extending from the switch 25. This switch may be a well-known double throw switch having the switching members 130 and 131, whereby the leads 16 and 17 may be switched serially directly through to 16' and 17' by connecting 130—131 with points 132—133 or may be connected alternately to the switching points 132, 133 to obtain reversed connection of the meter leads 16 and 17 with leads 16' and 17'. The switch may be enclosed in a suitable envelope, e. g., a flexible housing or one provided with suitable operating members and desired markings. Any convenient structure may be employed. This switch is not absolutely necessary, but is preferably provided in the meter leads in order to furnish an additional safeguard for the meter instruments. A suitable if desired flexible envelope will give the advantage of easy operation and will at the same time function as a handle.

It will be understood from the foregoing that my device represents not only the combination of a plug-cable-switch as recited previously, but also the additional combination of an analyzer switch per se. Some of the features disclosed herein may be used independently of others. Suitable shielding means may be provided wherever it is desired or necessary.

Other changes may be made, if desired, but I want to have it distinctly understood that all embodiments and changes are to be considered within the scope and meaning of the appended claims. In these claims I have pointed out what I consider my invention and desire to have protected by Letters Patent.

I claim:

1. A unitary radio testing device comprising, a tubular body, a socket at one end of said body for receiving a vacuum tube, a plug at the other end of said body for attaching said device to a radio apparatus, conductors disposed in said body between said socket and said plug and normally connecting corresponding points therebetween in series circuits, switching means disposed in said conductors within said tubular body, a meter circuit and conductors therefor terminating in said device, a rotatable tubular shell on said tubular body, and means operable by said shell upon rotation thereof whereby said meter circuit may be connected selectively to any of said conductors.

2. The structure defined in claim 1, wherein said plug is rotatable relative to said tubular body.

3. The structure defined in claim 1, wherein an indicating means is provided in conjunction with said rotatable shell to indicate the circuit relation of said meter conductors relative to said conductors disposed in said tubular body.

4. The structure defined in claim 1, wherein said socket at one end of said tubular body is adapted to accommodate any one of a plurality of distinct vacuum tubes each designed for different circuits.

5. The structure defined in claim 1, together with switching means disposed in said meter conductors for establishing conductive continuity thereof.

6. The structure defined in claim 1, together with reversing switching means disposed in said meter conductors for selectively establishing the polarity and conductive continuity thereof.

7. The device as defined in claim 1, wherein ground and shield leads are provided in addition to said circuits between said plug and socket points, and wherein said switching means is arranged to establish said selective connection of said meter leads relative to said circuits and to said ground and shield leads.

8. In combination, a substantially rigid tubular member constituting a test cable, a socket secured at one end thereof, a plug rotatably secured at the other end thereof, internally substantially fixed switching means connected with predetermined plug points and predetermined socket points respectively, test leads terminating in said test cable, and switching means comprising a tubular shell disposed rotatably on said test cable for selectively actuating said switching means to connect said test leads with any of said fixed switching means.

9. The combination defined in claim 8, together with indicating means whereby any selectively established connection between said test leads and said fixed switching means is visually indicated.

10. The combination recited in claim 8, wherein said internal switching means are substantially symmetrically disposed within said cable.

11. A unitary and self-contained circuit testing device of the class described comprising, a tubular rigid insulating body, a plug disposed at one end of said body and secured rotatably with respect to said body, a socket disposed at the other end of said body in fixed relation thereto, contact points on said plug and on said socket, conductors disposed within said tubular body for interconnecting said contact points, a switch interposed in each of said conductors within and secured to said tubular body, operating means one for each of said switches projecting through the wall of said tubular body to the outside thereof, a pair of tubular members disposed end to end and telescoped over said tubular body in rotatable relation thereto, and means disposed on the inside of said tubular members for actuating said operating means whereby said switches may be selectively operated responsive to the rotation of said tubular members relative to each other and relative to said tubular body.

12. The structure defined in claim 11, together with test leads terminating in said device and connected to one of said tubular members, whereby said test leads may be selectively connected relative to said conductors responsive to selective rotation of said tubular members on said tubular body.

13. The structure defined in claim 11, together with indicating means on said tubular members and on said tubular body whereby the relative angular position of each of said tubular members on said tubular body is visually indicated.

14. The structure defined in claim 1, wherein said switching means in any of said conductors may be selectively actuated to open the conductive continuity thereof and to connect said meter circuit in series therewith.

HENRY WEHMING.